No. 731,726. PATENTED JUNE 23, 1903.
G. WESTINGHOUSE, Jr.
METHOD OF AND MEANS FOR DRIVING ELECTRIC MOTORS.
APPLICATION FILED APR. 23, 1894.
NO MODEL.
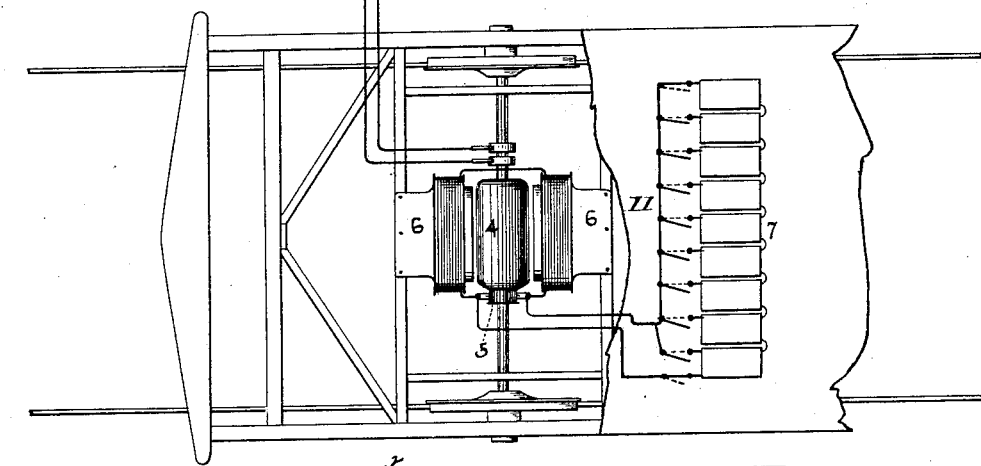
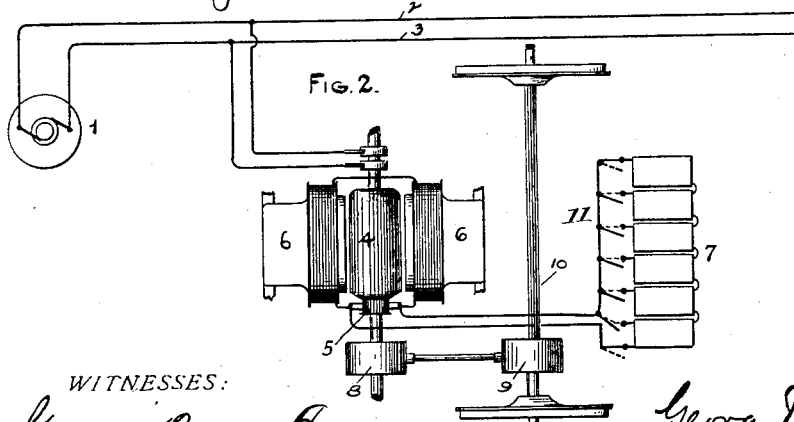
WITNESSES:
George Brown Jr.
H. C. Tener
INVENTOR.
George Westinghouse Jr.
BY Terry and MacKay
ATTORNEYS.

No. 731,726. Patented June 23, 1903.

UNITED STATES PATENT OFFICE.

GEORGE WESTINGHOUSE, JR., OF PITTSBURG, PENNSYLVANIA.

METHOD OF AND MEANS FOR DRIVING ELECTRIC MOTORS.

SPECIFICATION forming part of Letters Patent No. 731,726, dated June 23, 1903.

Application filed April 23, 1894. Serial No. 508,642. (No model.)

*To all whom it may concern:*

Be it known that I, GEORGE WESTINGHOUSE, Jr., a citizen of the United States, residing in Pittsburg, in the county of Allegheny and State of Pennsylvania, have invented a new and useful Improvement in Methods of and Means for Driving Electric Motors, (Case No. 589,) of which the following is a specification.

This invention has relation to a method and means for the translation of the energy of alternating electric currents into mechanical power, and is particularly adapted to the operation of machinery which is required to start under load—as, for instance, electric cars.

The object of this invention is the provision of a method and means whereby an ordinary motor of the direct-current type may be employed for driving machinery when supplied with an alternating current where the range of load is great and where great differences in potential of current supplied are to be looked for.

This invention also contemplates a method and means for starting motors of the above class when energized by alternating currents without the use of auxiliary motors, even when such starting is necessarily accomplished against a considerable load.

One of the advantages of my invention is that the alternating current is not employed for the excitement of the field-magnets of the motor and that the passage of current through the motor is not therefore lessened by the counter electromotive force or self-induction of the field-magnets, as it is in the case of a series direct-current type of motor, such as has been hitherto used for starting under a load.

My invention is illustrated in the accompanying drawings in one of its forms and without elaboration as to detail.

Figure 1 shows a portion of one end of the floor of an electric car, said floor being partly broken away for the purpose of disclosing the arrangement of the circuits and of the motor in driving the car; and Fig. 2 is a plan view of a single axle of a car and motor, showing the use of a hydraulic gear for transmitting power from the motor to the axle.

It will of course be understood that the drawings show only one application of my invention, which is not confined to electric railways, but is applicable as well to all purposes where motive power is necessary.

In the drawings the alternator 1 supplies the mains 2 3, from which alternating current is fed into the armature 4 of an ordinary shunt-wound direct-current-type motor. As shown in the drawings, this current is supplied through two collecting-rings; but the number of rings employed and their relation to the coils in the armature will depend upon the number of phases of current employed for driving the motor.

While I have illustrated a motor driven by a single phase of alternating current, it will be evident that more than one phase may be utilized for this purpose. The means whereby the moving car is enabled to derive its current from the mains are not illustrated in the drawings, as they may be of any suitable type.

The armature 4 is provided with the usual commutator 5, and when this motor is moving in synchronism with the alternator 1 it will supply direct current at this commutator, which, being taken off at the brushes, will excite the field-magnets 6. It will of course be understood that the type of direct-current motor employed is immaterial so long as it is adapted to the transformation of alternating into direct current when moving in synchronism with the alternator.

In the practice of my invention I employ a secondary battery 7, composed of any desired number of cells, said battery being placed in a shunt across the field-magnets 6 and being therefore supplied with current from the brushes on the commutator 5. It will be evident that as long as there is a sufficient potential across the alternating-current mains the motor will not only be driven by this current, but a portion of the direct current supplied from the brushes will be stored up in the accumulator 7. As it may not always be necessary to employ all of the cells of the storage battery, I provide a series of switches 11, by means of which one or more of the cells may be cut out and the rest utilized in the manner hereinbefore set forth. If, on the other hand, the potential across the alternating mains falls for any reason or if for any reason it is desirable to discontinue connection with the mains over any portion of the railway, the accumulator immediately becomes a driving-generator, which serves to energize the armature and field-magnets of the driving-motor, and thus to propel the car or other machinery connected with such motor.

The arrangement which I have invented becomes particularly useful in the case of electric cars, inasmuch as the storage battery, which is charged during the running of the car, may be employed in starting the car and the driving-motor may be brought up to synchronism with the alternator before throwing the alternating current into the motor. It will thus be seen that a form of motor not capable of starting by itself under a load when fed by alternating currents may be nevertheless utilized in connection with alternating currents by the employment of my invention.

From one point of view the motive device 4 6 may be looked upon as a rotary converter, utilized as well for production of mechanical power as for transformation of current.

In Fig. 2 I have shown my invention as employed for a constantly-running armature, the car being driven by means of any desired form of gear capable of engagement or disengagement at will with the motor or with the axle to be driven.

In the drawings the gear shown is a hydraulic gear consisting of a pump 8, preferably on the same shaft with the armature of the motor, but not necessarily so, as long as it is driven by the motor, and a hydraulic motor 9, adapted to drive the axle 10. Hydraulic gears for this purpose are known in the art, and I have therefore not illustrated any particular form of gear, it being within the power of any one skilled in the art to construct such a gear. With this form of device the motor may be kept running constantly in synchronism with the generator 1, the car being stopped, started, or having its speed varied by proper manipulation of the transmitting-gear. It will of course be understood that my invention is not limited to the use of hydraulic gear in this connection. The secondary battery 7 will be useful in this device both for running the car when the same is disconnected from the line and for aiding the motor when the potential diminishes for any reason. In starting there will of course be a tendency to slow the motor, and so make it fall out of synchronism; but this tendency will be counteracted by the presence of the secondary battery 7 and the constant speed of the motor thus maintained.

What I claim is—

1. A railway-vehicle, an electric propelling-motor therefor provided with a commutator intermediate the armature and field-magnet windings, a source of alternating current and means for conducting said current to the armature-winding of the motor; in combination with a secondary battery and means for connecting the same across the commutator-brushes of said motor, substantially as described.

2. A shunt-wound direct-current-type electric motor having a commutator and collecting-rings, a source of alternating electric current and means for conveying said current to the armature of the motor through said collecting-rings; in combination with a secondary battery connected across the commutator-brushes of said motor, a driving-axle and a variable gear connecting the shaft of said motor-armature with said axle, substantially as described.

3. The combination with a railway-vehicle and a synchronous motor for driving the same having a commutator connecting the armature and field-magnet windings, of a source of alternating currents, means for conducting the alternating current to the armature-winding of the motor, a secondary battery connected across the commutator-brushes of said motor, and means for varying the number of secondary-battery cells in circuit.

4. In a system of distribution for electric railways, the combination with a source of alternating currents and a supply main or mains extending therefrom along the railway, of a railway-vehicle, a synchronous alternating-current motor supported upon the vehicle-truck and a variable or adjustable gear connection between the armature-shaft of the motor and one of the vehicle-axles whereby the speed of the vehicle may be varied without varying the speed of the motor.

5. In a system of distribution for electric railways, the combination with a source of alternating currents and a supply main or mains extending along the line of the railway, of a car, a synchronous motor mounted thereon, adjustable means for gearing the motor-armature shaft to an axle of the vehicle and means for transforming and storing surplus electrical energy and for utilizing the same to drive the motor.

6. The combination with a source of alternating current, of a car, a driving synchronous motor therefor receiving current from said source and having a self-excited field-magnet, means for receiving and storing any excess of exciting-current, said means being connected and arranged to supply a reinforcing-current to the motor in starting the car and in propelling the same on upgrades.

7. The combination with a source of alternating currents, of a car, a propelling-motor receiving current from said source through collecting-rings and brushes and having a commutator connection between its armature and field-magnet coils, and a secondary battery connected across said commutator-brushes.

8. In an electric-railway system, an alternating-current generator, a car, a propelling synchronous motor receiving current from said source through collecting-rings and brushes, and provided with a commutator between its armature and field-magnet coils, in combination with a secondary battery provided with means for connecting a greater or less number of its cells across said commutator-brushes, either in series or in parallel, whereby surplus energy may be stored and the motor brought to and maintained in synchronism with the generator.

9. In an electric railway, the combination of a rotary transformer having its alternating-current end adapted to develop the average power required for driving a motor-car or locomotive and having its direct-current end connected with a storage battery which compensates for variations from the average load, a motor-car or locomotive carrying said apparatus and having its driving-wheels mechanically connected with the rotary transformer, power-station apparatus generating alternating current and having line or working circuit connections extending along the railway, and means for supplying current from said line or working circuit to the alternating-current end of the transformer, whereby the alternating current on the line or working circuit and on the power-station apparatus is kept uniform thus permitting of the installation of the latter for the average load, substantially as described.

10. In an electric railway the combination of a rotary transformer having its alternating-current end adapted to develop the average power required for driving a motor-car or locomotive and having its direct-current end connected with a storage battery which compensates for variations from the average load, a motor-car or locomotive carrying said apparatus and having its driving-wheels mechanically connected with the rotary transformer, power-station apparatus generating alternating current and having line working circuit connections extending along the railway, means for supplying current from said line or working circuit to the alternating-current end of the transformer, and devices for including and excluding the rotary transformer in and from the line or working circuit, whereby the alternating current on the line or working circuit and on the power-station apparatus is kept uniform thus permitting of the installation of the latter for the average load, substantially as described.

11. In an electric railway the combination of, a rotary transformer having its alternating-current end adapted to develop the average power required for driving a motor-car or locomotive and having its direct-current end connected with a storage battery which compensates for variations from the average load, a motor-car or locomotive carrying said apparatus and having its driving-wheels mechanically connected with the rotary transformer, power-station apparatus generating alternating current and having line or working circuit connections extending along the railway, means for supplying current from said line or working circuit to the alternating-current end of the transformer, and apparatus for varying the electromotive force of the battery and direct-current end of the rotary transformer in respect to each other, whereby the alternating current on the line or working circuit and on the power-station apparatus is kept uniform thus permitting of the installation of the latter for the average load, substantially as described.

In testimony whereof I have hereunto subscribed my name this 19th day of April, A. D. 1894.

GEO. WESTINGHOUSE, JR.

Witnesses:
JAMES WM. SMITH,
HAROLD S. MACKAYE.